US011137669B2

(12) United States Patent
Du et al.

(10) Patent No.: US 11,137,669 B2
(45) Date of Patent: Oct. 5, 2021

(54) COLOR-WHEEL HEAT-DISSIPATION APPARATUS AND PROJECTION DEVICE HAVING SAME HEAT-DISSIPATION APPARATUS

(71) Applicant: APPOTRONICS CORPORATION LIMITED, Guangdong (CN)

(72) Inventors: Lunchun Du, Shenzhen (CN); Min Huang, Shenzhen (CN); Lan Min, Shenzhen (CN); Yi Li, Shenzhen (CN)

(73) Assignee: Appotronics Corporation Limited, Guangdong (CN)

( * ) Notice: Subject to any disclaimer, the term of this patent is extended or adjusted under 35 U.S.C. 154(b) by 153 days.

(21) Appl. No.: 16/081,408

(22) PCT Filed: Apr. 20, 2017

(86) PCT No.: PCT/CN2017/081203
§ 371 (c)(1),
(2) Date: Aug. 30, 2018

(87) PCT Pub. No.: WO2017/215345
PCT Pub. Date: Dec. 21, 2017

(65) Prior Publication Data
US 2020/0387056 A1 Dec. 10, 2020

(30) Foreign Application Priority Data
Jun. 14, 2016 (CN) .......................... 201610421892.1

(51) Int. Cl.
*G03B 21/16* (2006.01)
*G02B 26/00* (2006.01)
*G03B 21/20* (2006.01)

(52) U.S. Cl.
CPC ........... *G03B 21/16* (2013.01); *G02B 26/008* (2013.01); *G03B 21/20* (2013.01)

(58) Field of Classification Search
CPC ...... G03B 21/16; G03B 21/20; G03B 21/145; G03B 21/204; H04N 9/315; H04N 9/3105;
(Continued)

(56) References Cited

U.S. PATENT DOCUMENTS

2003/0095349 A1  5/2003  Inamoto
2005/0036289 A1* 2/2005  Lee ..................... H01L 23/4006
                                                                 361/699
(Continued)

FOREIGN PATENT DOCUMENTS

CN    101093344 A    12/2007
CN    102455580 A    5/2012
(Continued)

OTHER PUBLICATIONS

International Search Report of corresponding Patent Application No. PCT/CN2017/081203—4 pages (dated Jun. 30, 2017).
(Continued)

*Primary Examiner* — Sultan Chowdhury
(74) *Attorney, Agent, or Firm* — Knobbe, Martens, Olson & Bear, LLP

(57) ABSTRACT

A color wheel heat dissipation device and a projection apparatus having the same are provided. The color wheel heat dissipation device includes a housing, a color wheel, a built-in radiator and a fan, wherein the housing includes a first cavity, a second cavity, and a third cavity that are mutually communicated with one another, the first cavity and the second cavity are sequentially arranged in an airflow direction; the built-in radiator is located in the first cavity; the fan is located in the second cavity; and the color wheel is located in the third cavity. The color wheel heat dissipation device and the projection apparatus having the color wheel heat dissipation device can maximally increase the
(Continued)

heat exchange rate in the color wheel cavity, improve performance of the color wheel, reduce temperature of the color wheel, thereby achieving the purpose of improving efficiency and service life of the product.

16 Claims, 3 Drawing Sheets

(58) Field of Classification Search
CPC .. H04N 9/3111; H04N 9/3141; H04N 9/3152; H04N 9/3144; H04N 9/3197; G02B 26/04; G02B 26/008
See application file for complete search history.

(56) References Cited

U.S. PATENT DOCUMENTS

| | | | |
|---|---|---|---|
| 2012/0013854 A1* | 1/2012 | Nishimura | G03B 21/16 353/57 |
| 2015/0029472 A1 | 1/2015 | Lin et al. | |
| 2015/0092164 A1 | 4/2015 | Lin et al. | |
| 2015/0131062 A1* | 5/2015 | Nishimori | F21V 14/08 353/84 |
| 2015/0338725 A1* | 11/2015 | Kase | G03B 21/20 353/58 |
| 2016/0077326 A1* | 3/2016 | Yamagishi | G02B 7/008 353/61 |
| 2016/0124292 A1* | 5/2016 | Asano | F21V 29/65 353/52 |

FOREIGN PATENT DOCUMENTS

| | | |
|---|---|---|
| CN | 102591115 A | 7/2012 |
| CN | 203365896 U | 12/2013 |
| CN | 203643734 U | 6/2014 |
| CN | 203883953 U | 10/2014 |
| CN | 205787557 U | 12/2016 |
| CN | 107505804 A | 12/2017 |
| JP | 2007-256451 | 10/2007 |
| KR | 10-2008-0001077 A | 1/2008 |
| WO | WO 2015/166553 A1 | 11/2015 |

OTHER PUBLICATIONS

Chinese Office Action issued in application No. 201610421892.1 dated Sep. 10, 2018.
Chinese Office Action issued in application No. 201610421892.1 dated Feb. 25, 2019.
Chinese Search Report issued in application No. 201610421892.1 dated Aug. 21, 2018.
Extended European Search Report issued in application No. 17812457.4 dated Aug. 7, 2019.
Japanese Office Action issued in application No. 2018-545862 dated Aug. 16, 2019.
Japanese Office Action issued in application No. 2018-545862 dated Dec. 27, 2019.

* cited by examiner

COLOR-WHEEL HEAT-DISSIPATION APPARATUS AND PROJECTION DEVICE HAVING SAME HEAT-DISSIPATION APPARATUS

CROSS-REFERENCE TO RELATED APPLICATIONS

The present application is a national phase application of International Application No. PCT/CN2017/081203 filed on Apr. 20, 2017, which claims priority to Chinese Patent Application No. 201610421892.1, filed on Jun. 14, 2016, the contents of each of which are incorporated herein by reference in its entirety and made a part of this specification.

TECHNICAL FIELD

The present disclosure relates to the field of color wheel heat dissipation technologies, and particularly, to a color wheel heat dissipation device and a projection apparatus having the color wheel heat dissipation device.

BACKGROUND

In a laser projection apparatus, a color light sequence is generated by laser exciting a fluorescent color wheel, in which the laser light is generated by a laser light source. As the power of the light output by the light source increases, the thermal power consumption of the color wheel also increases. If the heat dissipation of the color wheel is poor, it will greatly reduce the efficiency of the phosphor being excited to emit light, or even result in damage of the color wheel itself.

The color wheel mainly exchanges heat with air through high-speed rotation. The higher the relative speed of the color wheel with respect to the air is, the higher the convective heat transfer coefficient will be. The venting component sucks in cold air and simultaneously discharges hot air.

FIGS. 1 and 2 are structural schematic diagrams showing a color wheel heat dissipation device in the prior art. The color wheel heat dissipation device includes: a first housing 100', a first fan 300', a first color wheel 800', a first built-out air duct 170', a first built-out heat exchanger 500', a first air outlet 190' of the first housing 100', a first air inlet 180', and a first built-in air duct 160' in the housing of the color wheel.

In the conventional color wheel heat dissipation device, the cold airflow enters into the interior of the first housing 100' through the first air inlet 180' passing through the first built-in air duct 160', then flows through the first housing 100' and then is discharged from the first air outlet 190'. Generally, the cold airflow first facilitates heat dissipation at the surface of the first color wheel 800', and then facilitates heat dissipation at the rotation axis of the first color wheel 800'. Since the ability of high temperature resistance of the rotation axis of the color wheel is often lower than that of the surface of the color wheel, when the color wheel is still in its temperature resistance range, the rotation axis of the color wheel has exceeded its temperature resistance range, the heat dissipation effect of the rotation axis of the first color wheel 800' is reduced, thus reducing the performance of the first color wheel 800'. In addition, the first built-out heat exchanger 500', the first built-out air duct 170', the first fan 300' and the first housing 100' are separately provided, thus occupying a large space and having complicated assembling processes.

SUMMARY

The present disclosure proposes a color wheel heat dissipation device and a projection apparatus having the same, which can maximize the heat exchange rate in the cavity of the color wheel, improve the performance of the color wheel performance, and reduce the temperature of the color wheel, especially the rotation axis of the color wheel, thus realizing the purpose of improving efficiency and service life of the product.

The present disclosure provides a color wheel heat dissipation device and a projection apparatus having the color wheel heat dissipation device. The color wheel heat dissipation device includes a housing, a color wheel, a built-in heat exchanger and a fan;

The housing includes a first cavity, a second cavity, and a third cavity that are mutually communicated with one another, the first cavity and the second cavity being sequentially arranged in an airflow direction;

The built-in heat exchanger is located in the first cavity;

The fan is located in the second cavity;

The color wheel is located in the third cavity.

In the color wheel heat dissipation device as described above, the first cavity and the second cavity are arranged side by side.

In the color wheel heat dissipation device as described above, the first cavity includes a suction port, and the first cavity is communicated with an interior of the third cavity through the suction port.

In the color wheel heat dissipation device as described above, the second cavity includes an exhaust port, and the second cavity is communicated with an interior of the third cavity through the exhaust port.

In the color wheel heat dissipation device as described above, an opening of the exhaust port faces a rotation axis of the color wheel.

The color wheel heat dissipation device as described above further includes a built-out radiator and a heat conduction pipe, in which the built-out radiator is thermally connected to the built-in radiator through the heat conduction pipe.

The color wheel heat dissipation device as described above further includes a mounting plate, in which the heat conduction pipe is fixedly connected to the housing through the mounting plate.

The color wheel heat dissipation device as described above further includes a deflector located at the exhaust port and extends to a position close to the rotation axis of the color wheel.

In the color wheel heat dissipation device as described above, the airflow sequentially circulates along the third cavity, the first cavity and the second cavity.

The present disclosure also proposes a projection apparatus including any one of the above color wheel heat dissipation devices.

By using the color wheel heat dissipation device and the projection apparatus having the color wheel heat dissipation device as described above, the fan and the built-in heat exchanger are placed in a same housing, and the fan is located downstream of the heat exchanger in a flow direction of the airflow in the housing, so that the fan is capable of operating at a relatively low temperature, thus increasing the service life of the fan.

By using a deflector structure arranged at the exhaust port, the cold airflow discharged from the fan directly acts on the rotation axis of the color wheel, thereby the temperature of the rotation axis of the color wheel can be maximally reduced, and the performance of the color wheel can be improved, thus realizing the purpose of improving the efficiency and service life of the product.

By arranging the color wheel, the heat exchanger and the fan in different cavities of a same housing, the structural complexity of the color wheel heat dissipation device is reduced, and the integration degree of the product is improved.

By connecting the built-in heat exchanger with the built-out heat exchanger through the heat conduction pipe, the heat in the housing is effectively transmitted to the exterior of the housing, which effectively realizes heat exchange between the interior and the exterior of the housing, reduces the temperature in the housing, and effectively improves efficiency and service life of the product.

BRIEF DESCRIPTION OF DRAWINGS

The present disclosure will be described in detail below with reference to the accompanying drawings. The above and other aspects of the present disclosure will become more apparent from the detailed description combined with the following drawings. In the drawings.

REFERENCE SIGNS

100: housing, 110: first cavity, 120: second cavity, 130: third cavity,
140: air inlet, 150: exhaust port, 160: built-in air duct, 170: built-out air duct,
180: air inlet, 190: air outlet;
100': first housing, 160': first built-in air duct, 170': first built-out air duct;
180': first air inlet, 190': first air outlet;
200: built-in radiator;
300: fan, 300': first fan;
400: deflector;
500: built-out radiator, 500': first built-out radiator;
600: heat conduction pipe;
700: mounting plate;
800: color wheel, 800': color wheel.

DESCRIPTION OF EMBODIMENTS

Specific embodiments of the present disclosure will be described in detail below with reference to the accompanying drawings.

The specific embodiments and examples described herein are particular specific embodiments of the present disclosure, which are intended to illustrate the concept of the present disclosure. The embodiments are all explanatory and exemplary, which shall not be construed to limit the embodiments of the present disclosure and the scope of the present disclosure. In addition to the examples recorded herein, those skilled in the art will be able to derive other obvious technical solutions based on the contents disclosed by the claims and the description of the present disclosure, these technical solutions include the alternatives and modifications of the recorded embodiments herein, which are all in the scope of the present disclosure.

Figure 1:
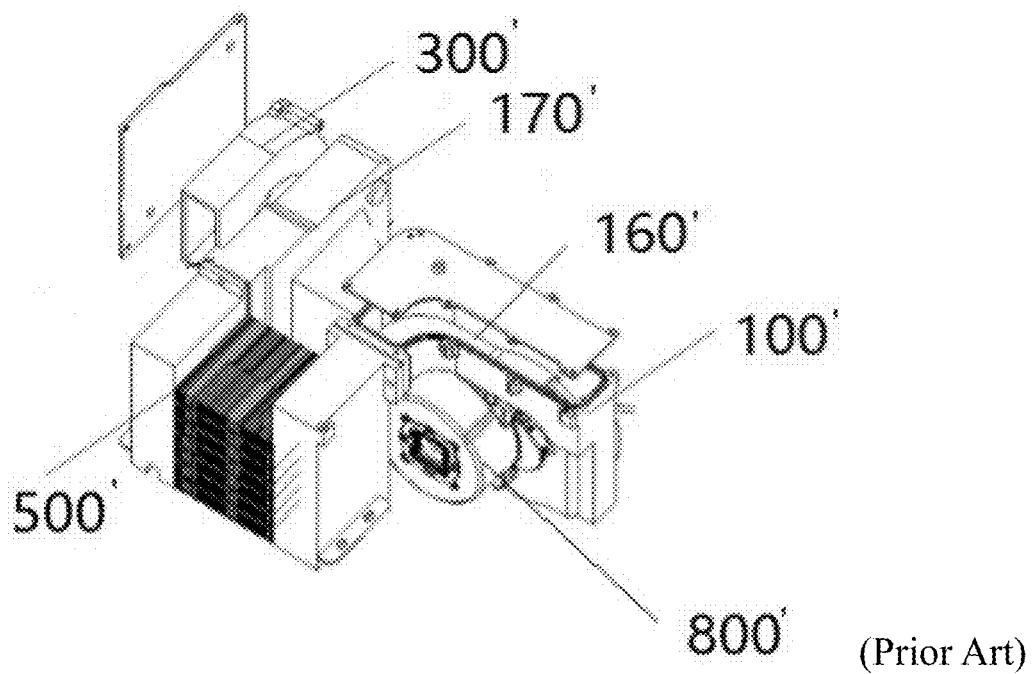
FIGS. 1 and 2 are structural schematic diagrams showing a color wheel heat dissipation device in the prior art.
Figure 2:
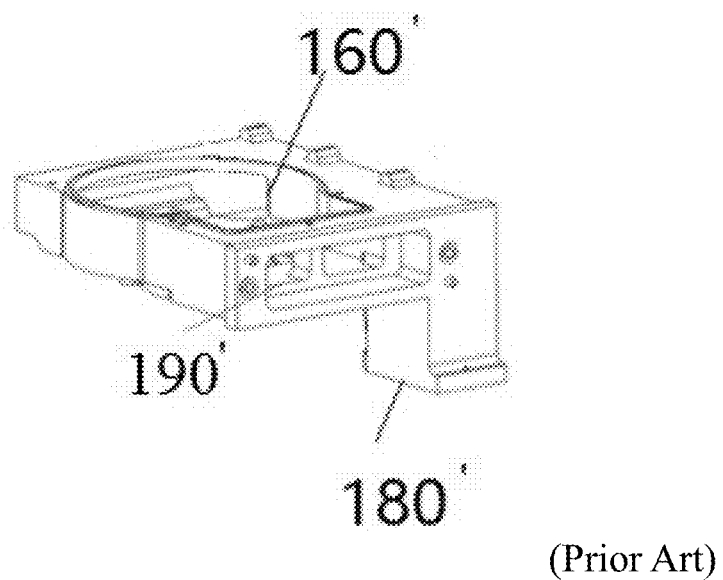
Figure 3:
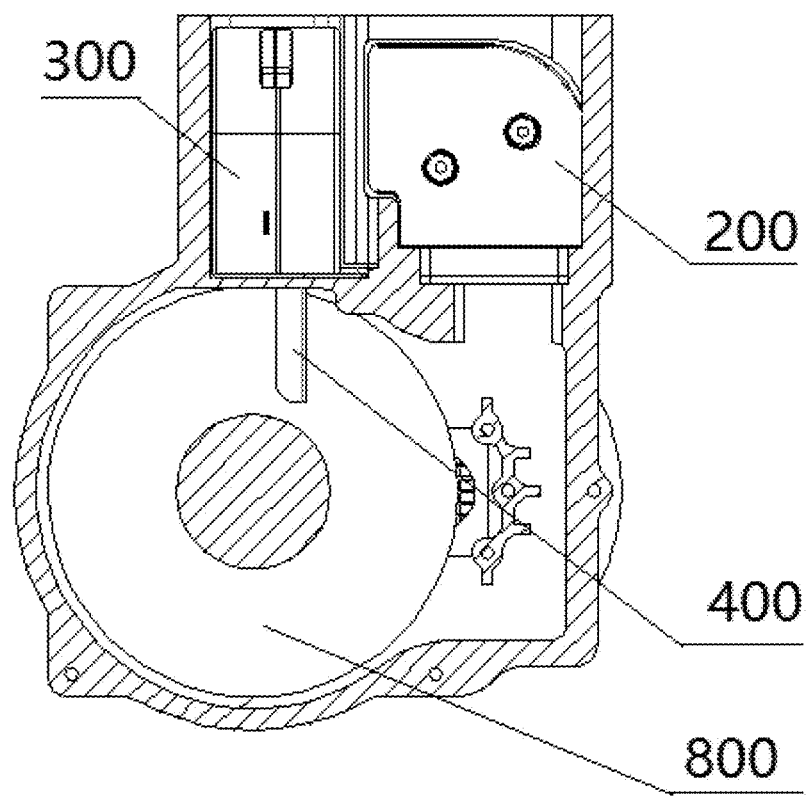
FIGS. 3 and 4 are structural schematic diagrams of a housing in a color wheel heat dissipation device according to the present disclosure and a housing of the color wheel heat dissipation device in a projection apparatus according to the present disclosure, respectively.
Figure 4:
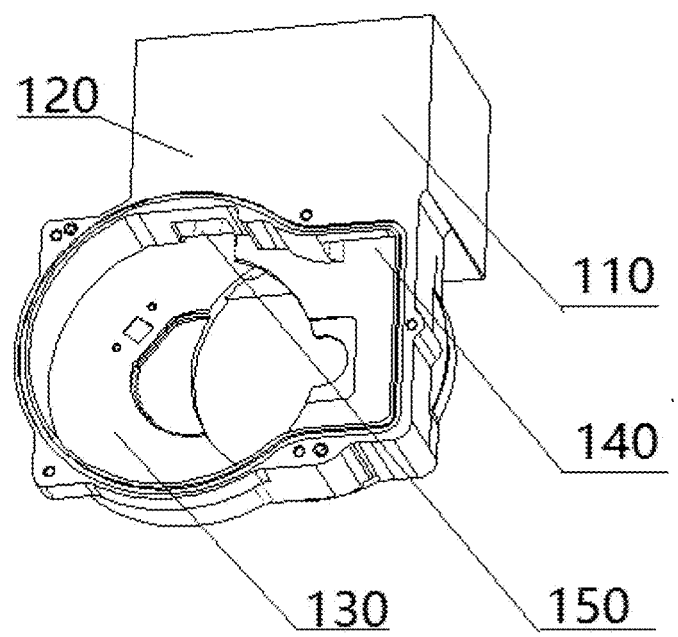
Figure 5:
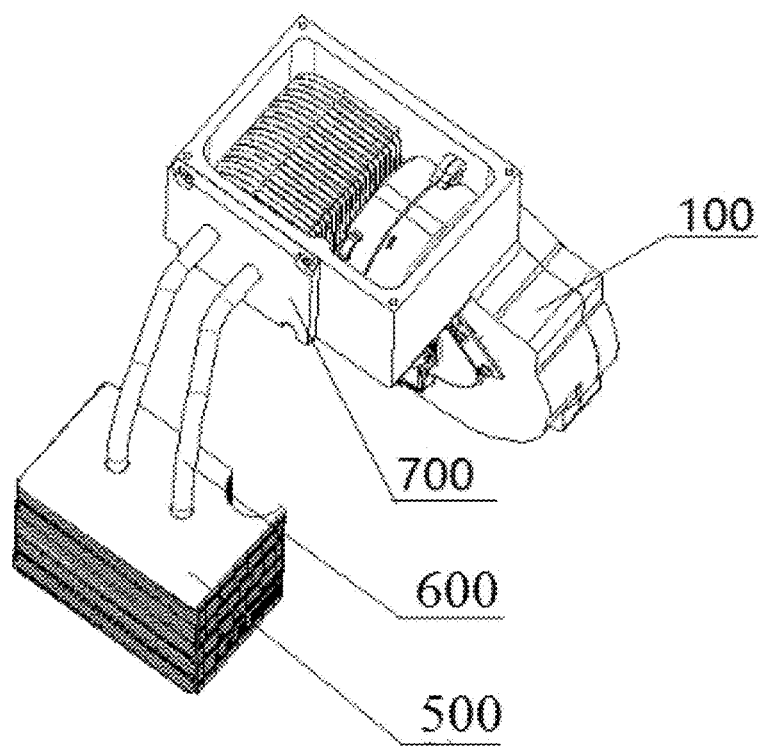
FIG. 5 is a structural schematic diagram of a color wheel heat dissipation device and the color wheel heat dissipation device in a projection apparatus according to the present disclosure.

FIGS. 3 and 4 are structural schematic diagrams of a color wheel heat dissipation device according to the present disclosure. As shown in FIGS. 3 and 4, the color wheel heat dissipation device includes a housing 100, a color wheel 800, a built-in radiator 200, and a fan 300. The housing 100 includes a first cavity 110, a second cavity 120, and a third cavity 130 that are communicated with one another. The first cavity 110 and the second cavity 120 are sequentially arranged along the airflow direction. The built-in radiator 200 is located in the first cavity 110. The fan 300 is located in the second cavity 120. The color wheel 800 is located in the third cavity.

The housing 100 includes a first cavity 110, a second cavity 120, and a third cavity 130 that are communicated with one another and in which the airflow can be internally circulated. The first cavity 110 includes a built-in radiator 200 and the second cavity 120 includes a fan 300. The first cavity 110 and the second cavity 120 form a heat dissipation cavity. The airflow in the third cavity 130 enters into the interior of the first cavity 100. The airflow passes through the built-in radiator 200 (such as a semiconductor refrigerator made according to Peltier effect of a semiconductor material. The so-called Peltier effect refers to a phenomenon in which one end of a galvanic couple consisting of two semiconductor materials absorbs heat and the other end thereof releases heat when a direct current flows through the galvanic couple) to perform heat exchange, and a cold airflow is then generated in the first cavity 110.

The cold airflow is further delivered into the interior of the second cavity 120. The cold airflow in the second cavity 120 is again delivered into the interior of the third cavity 130 by the action of the fan 300, and the rotation axis of the color wheel 800 is cooled. The color wheel rotation axis described herein includes a motor shaft driving the color wheel to rotate or is an adapter shaft connecting with the color wheel and the motor. The third cavity 130 serves as a color wheel cavity for accommodating the color wheel 800. Meanwhile, the color wheel rotation axis driving the color wheel to rotate is also located in the third cavity 130.

Meanwhile, the fan 300 is located downstream of the built-in radiator 200 in the airflow direction. Correspondingly, the airflow sucked by the fan 300 is a cold airflow, so that the fan 300 can be operated at a relative low temperature, thereby improving the service life of the fan 300.

Further, the first cavity 110 further includes a suction port 140. The first cavity 110 is connected to the interior of the third cavity 130 through the suction port 140.

The hot airflow in the third cavity 130 enters into the interior of the first cavity 110 through the suction port 140, performs heat exchange through the built-in radiator 200, and forms a cold airflow having a relative low temperature.

Further, the second cavity 120 includes an exhaust port 150. The second cavity 120 communicates with the interior of the third cavity 130 through the exhaust port 150.

The cold airflow inside the second cavity 120 enters into the interior of the third cavity 130 through the exhaust port 150, and cools the color wheel rotation axis.

Further, the opening position of the exhaust port 150 is arranged corresponding to the rotation axis of the color wheel 800. The cool air discharged from the exhaust port 150 directly acts on the rotation axis of the color wheel 800. Such a structural design can maximize the heat exchange rate inside the housing, reduce the temperature of the color wheel rotation axis, and improve the performance of the color wheel, thereby improving the efficiency and service life of the product.

In some embodiments, the color wheel heat dissipation device further includes a deflector 400. The deflector 400 is located at the exhaust port 150 and extends into the third cavity 130.

The arrangement of the deflector 400 can ensure that the cold air discharged from the exhaust port 150 can directly and accurately act on the rotation axis of the color wheel 800. The output airflow of the fan 200 is discharged towards the rotation axis of the coloring wheel 800 directly by the action of the deflector 400. Therefore, the cold airflow first performs heat dissipation to the rotation axis of the color wheel 800, and then performs heat dissipation to the surface of the color wheel 800. Therefore, a good heat dissipation effect can be achieved by the rotation axis of the color wheel 800, which is beneficial to improve efficiency and service life of the product.

Meanwhile, the arrangement of the deflector 400 can prevent the cold airflow cooled by the built-in radiator 200 discharged from the exhaust port 150 from being directly sucked into the suction port 140 without performing heat dissipation to the color wheel 800 and the rotation axis of the color wheel 800, in addition to the function of guiding the airflow direction, thus avoiding unnecessary energy waste.

Further, the deflector 400 can also be formed integrally with the housing 100. The structure must ensure that the cold airflow discharged from the exhaust port 150 directly and accurately acts on the rotation axis of the color wheel 800.

In another embodiment of the disclosure, the color wheel heat dissipation device further includes a built-out radiator 500 and a heat conduction pipe 600. The built-out radiator 500 communicates with the built-in radiator 200 through the heat conduction pipe 600. The built-in radiator 200, the built-out radiator 500, and the heat conduction pipe 600 together form a heat pipe radiator.

The built-in radiator 200 communicates with the built-out radiator 500 through the heat conduction pipe 600, so that the heat in the housing 100 is conducted from the built-in radiator 200 to the exterior of the housing 100 through the built-out radiator 500. The temperature of the airflow in the second chamber 120 is lowered to form a cold airflow with a relative low temperature. The cold airflow is configured to subsequently cool the rotation axis of the color wheel 800.

The color wheel heat dissipation device of the embodiments includes two heat conduction pipes 600. The heat conduction pipe 600 has one end connected to the built-in radiator 200 and the other end connected to the built-out radiator 500.

The heat conduction pipe 600 can be a heat pipe. The heat pipe utilizes evaporation cooling so that the temperature difference between the two ends of the heat pipe is large, thus achieving quick heat conduction. The interior of the heat pipe is extracted to a negative pressure state, and the interior thereof is filled with suitable liquid. This liquid has a low boiling point and is easily volatilized. The pipe wall has a suction wick composed of a capillary porous material. When one end of the heat pipe is heated, the liquid in the capillary evaporates rapidly, a steam flows to the other end under a slight pressure difference, releases the energy, and is re-condensed into a liquid. The condensed liquid is returned to the end by capillary action along the porous material. This cycle reciprocates and transfers heat from one end of the heat pipe to the other end of the heat pipe.

When the temperature of the built-in radiator 200 rises, the end of the heat conduction pipe 600 connected with the built-in radiator 200 transfers heat to the other end of the heat conduction pipe 600 connected with the built-out radiator 500. Heat is transferred to the environment through the built-out radiator 500. Meanwhile, the temperature inside the built-in radiator 200 is lowered.

Further, the color wheel heat dissipation device further includes a mounting plate 700. The heat conduction pipe 600 is fixedly connected to the housing 100 through the mounting plate 700.

The mounting plate is located outside the housing 100 and is fixedly connected to the housing. The heat conduction pipe 600 for performing heat exchange between the interior and exterior of the housing is connected and fixed with the housing 100 through the mounting plate 700.

A normal operating process of the color wheel heat dissipation device in the embodiments is explained as follows.

The color wheel 800 normally rotates. Meanwhile, since the color wheel 800 is rotated in a high speed to absorb light beam, which generates a portion of the heat in the third cavity 130. The heat mixed in the airflow forms a hot airflow which enters into the interior of the first cavity 110 through the suction port 140.

The hot airflow inside the first cavity 110 passes through the built-in radiator 200, and the heat contained in the airflow is transmitted to the built-out radiator 500 through the heat conduction pipe 600. The built-out radiator 500 transfers the heat to the external space. Meanwhile, the temperature in the first cavity 110 is lowered to form a cold airflow.

The cold airflow in the second cavity 120 is discharged from the exhaust port 150 by the action of the fan 300. The cold airflow discharged from the exhaust port 150 can act on the rotation axis of the color wheel 800 to lower the temperature of the rotation axis of the color wheel 800, thereby improving the operating performance of the color wheel 800.

In some embodiments, a deflector 400 can be provided at the exhaust port 150. The deflector 400 can ensure that the cold air discharged from the exhaust port 150 further accurately acts on the rotation axis of the color wheel 800 through the action of the deflector.

The cold airflow entered into the interior of the third cavity 130 first performs heat dissipation to the rotation axis of the color wheel 800, and then performs heat dissipation to the surface of the color wheel 800, thereby improving the operating performance of the color wheel 800.

After the cold airflow is subjected to heat exchange in the third cavity 130, it enters into the interior of the first cavity 110 through the suction port 140 again, and heat exchange is performed by the built-in radiator 200. In such a reciprocating cycle, the rotation axis of the color wheel 800 is continuously cooled.

The present disclosure also proposes a projection apparatus, in which the projection apparatus includes the color wheel heat dissipation device of any one of the above embodiments.

By using the projection apparatus of the present disclosure, the heat exchange rate in the cavity of the color wheel can be maximized, the performance of the color wheel can be improved, and the temperature of the color wheel axis can be reduced, thereby achieving the purpose of improving efficiency and service life of the product.

Finally, it should be noted that the technical features disclosed above are not limited to the disclosed contents, and those skilled in the art can also modify the respective technical features themselves or change the combination of technical features according to the object of the present disclosure, so as to realize the purpose of the present disclosure. However, these amendments with such modifications are intended to fall in the scope of the present disclosure.

What is claimed is:

1. A color wheel heat dissipation device, comprising: a housing, a color wheel, a built-in radiator and a fan, wherein
   the housing comprises a first cavity, a second cavity, and a third cavity that are mutually communicated with one another, the first cavity and the second cavity being sequentially arranged in an airflow direction;
   the built-in radiator is located within the first cavity;
   the fan is located within the second cavity;
   the color wheel is located within the third cavity; and
   wherein the second cavity comprises an exhaust port, and the second cavity is communicated with an interior of the third cavity through the exhaust port.

2. The color wheel heat dissipation device according to claim 1, wherein the first cavity and the second cavity are arranged side by side.

3. A projection apparatus, comprising the color wheel heat dissipation device according to claim 2.

4. The color wheel heat dissipation device according to claim 1, wherein the first cavity comprises a suction port, and the first cavity is communicated with an interior of the third cavity through the suction port.

5. A projection apparatus, comprising the color wheel heat dissipation device according to claim 4.

6. The color wheel heat dissipation device according to claim 1, wherein an opening of the exhaust port faces a rotation axis of the color wheel.

7. A projection apparatus, comprising the color wheel heat dissipation device according to claim 6.

8. The color wheel heat dissipation device according to claim 1, further comprising a built-out radiator and a heat conduction pipe, wherein the built-out radiator is thermally connected to the built-in radiator through the heat conduction pipe.

9. The color wheel heat dissipation device according to claim 8, further comprising a mounting plate, wherein the heat conduction pipe is fixedly connected to the housing through the mounting plate.

10. A projection apparatus, comprising the color wheel heat dissipation device according to claim 8.

11. A projection apparatus, comprising the color wheel heat dissipation device according to claim 9.

12. The color wheel heat dissipation device according to claim 1, further comprising a deflector, wherein the deflector is located at the exhaust port and extends to a position close to a rotation axis of the color wheel.

13. A projection apparatus, comprising the color wheel heat dissipation device according to claim 12.

14. The color wheel heat dissipation device according to claim 1, wherein airflow sequentially circulates along the third cavity, the first cavity, and the second cavity.

15. A projection apparatus, comprising the color wheel heat dissipation device according to claim 14.

16. A projection apparatus, comprising the color wheel heat dissipation device according to claim 1.

* * * * *